United States Patent

Hathaway, Jr.

[15] 3,638,991
[45] Feb. 1, 1972

[54] PICKUP TRUCK AND TRAILER PASSAGEWAY DEVICE

[72] Inventor: Milton R. Hathaway, Jr., 30 Parlee Road, Chelmsford, Mass. 01824

[22] Filed: July 10, 1970

[21] Appl. No.: 53,971

Related U.S. Application Data

[63] Continuation-in-part of Ser. No. 716,040, Mar. 26, 1968, abandoned.

[52] U.S. Cl............................................296/23, 105/18
[51] Int. Cl.................................................B60p 3/32
[58] Field of Search..................296/23, 23 MC; 105/18

[56] References Cited

UNITED STATES PATENTS

| 2,568,684 | 9/1951 | Mihalyi | 105/18 |
| 3,297,355 | 1/1967 | Robinson | 296/23 MC |
| 3,321,234 | 5/1967 | Harrell | 296/23 MC |

*Primary Examiner*—Philip Goodman
*Attorney*—Robert E. Kleve

[57] ABSTRACT

The invention comprises a pickup truck having a box at the rear with a camper mounted on said box. The pickup truck having a cab, with a doorway in the rear of said cab and camper has a doorway in its front and a sleeve connects the doorways together, the cab has a movable door for said cab doorway and the camper has an enclosure in the doorway of said camper.

3 Claims, 17 Drawing Figures

PATENTED FEB 1 1972 3,638,991

INVENTOR
Milton R. Hathaway, Jr.
BY Robert E. Kleve
ATTORNEY

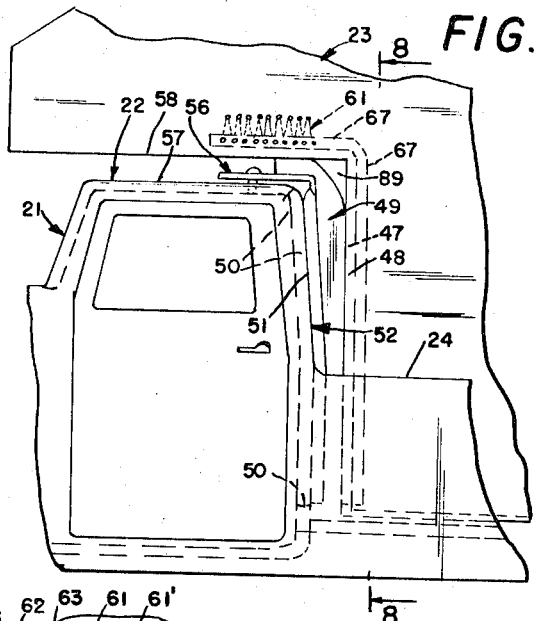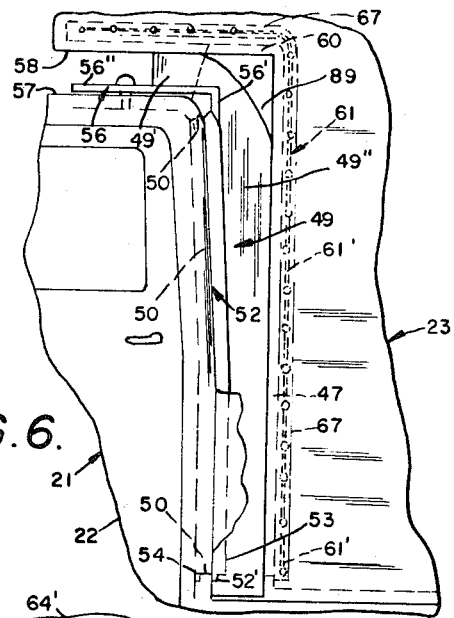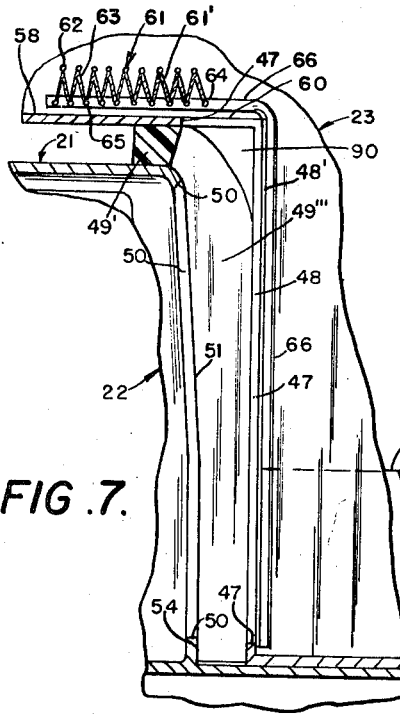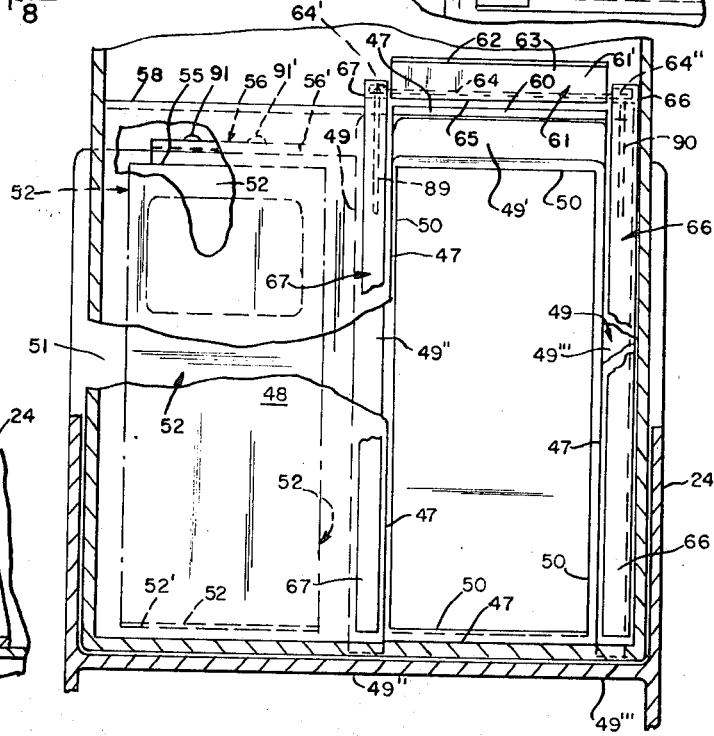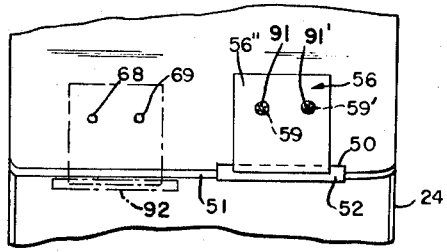

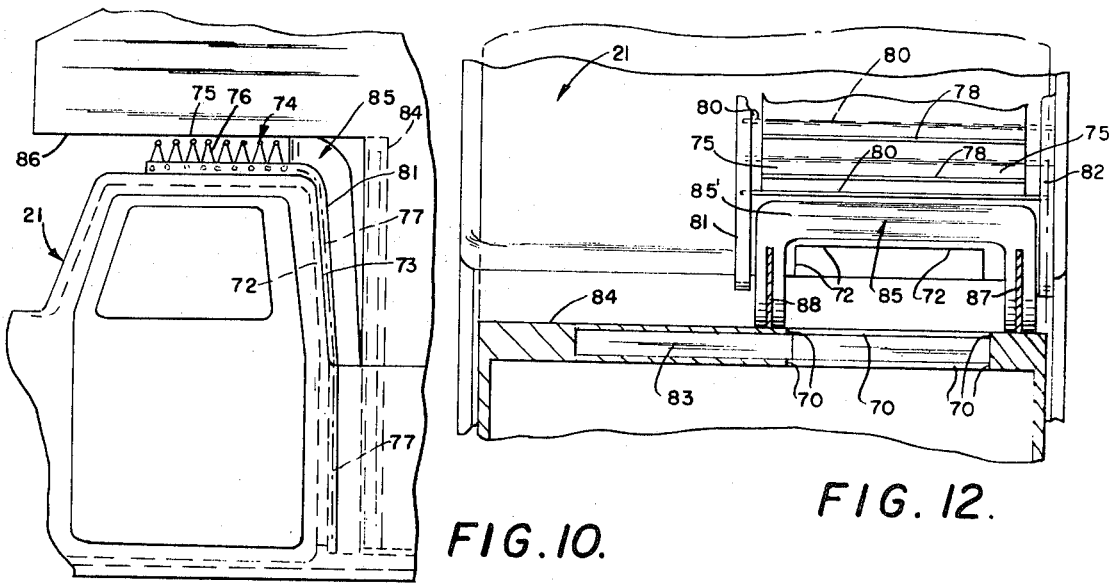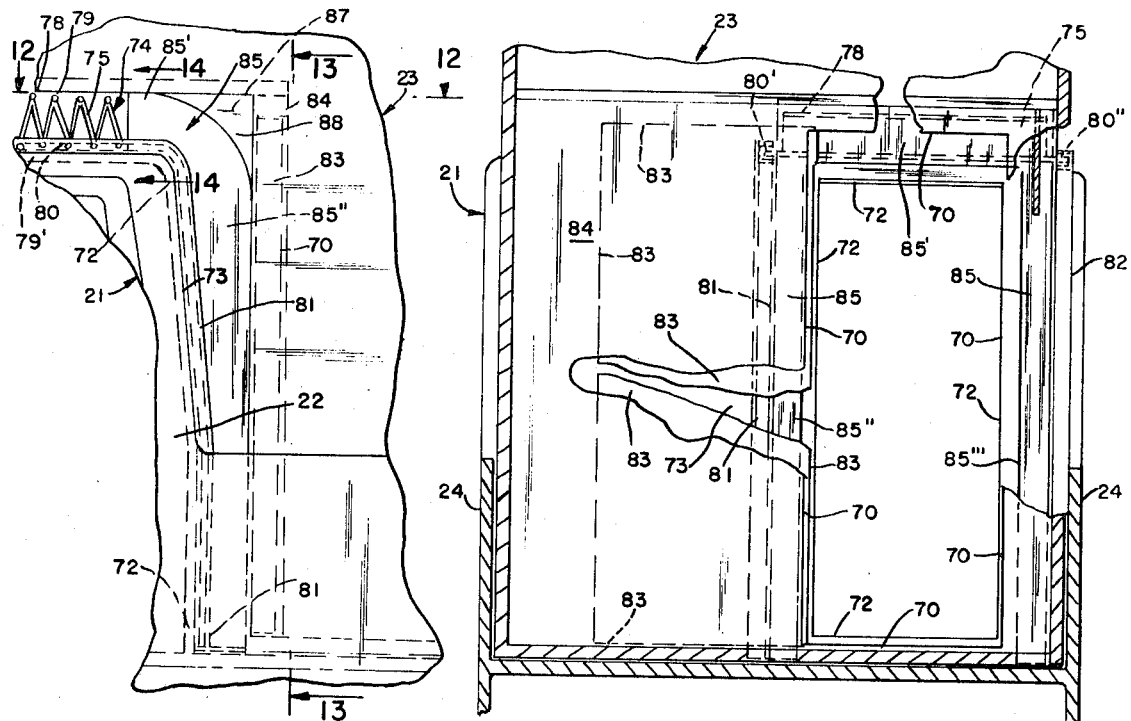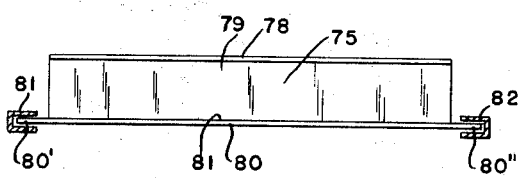

PICKUP TRUCK AND TRAILER PASSAGEWAY DEVICE

The invention relates to mobile campers, more particularly, the invention relates to campers mounted on pickup trucks. This application is a continuation-in-part of my earlier copending patent application Ser. No. 716,040, filed Mar. 26, 1968, now abandoned.

It is an object of the invention to provide a novel passageway structure connecting the camper on a pickup truck with the cab of the truck.

It is a further object of the invention to provide a novel connecting passageway structure between the camper of the pickup truck and the cab which is adjustable to different-size campers and trucks, and to provide a weatherproof passageway between the camper and cab of a pickup truck while the truck is in motion.

It is another object of the invention to provide a novel pickup truck and camper device which includes a structure for separating and for closing the camper, and for closing the cab when the camper is detached from the truck.

Further objects and advantages of the invention will become apparent as the description proceeds and when taken in conjunction with the accompanying drawing wherein:

FIG. 5 is fragmentary side elevational view of a first modified form of the invention.

FIG. 6 is an enlarged fragmentary side elevational view similar to FIG. 5 of the first modified form, with the folding camper door shown closed.

FIG. 7 is an enlarged cross-sectional view similar to FIG. 5.

FIG. 8 is an enlarged fragmentary cross-sectional view taken along line 8—8 of FIG. 5.

FIG. 9 is a top plan view of the cab of the first modified form, with the camper removed.

FIG. 10 is a fragmentary side elevational view of a second modified form of the invention.

FIG. 11 is an enlarged side elevational view similar to FIG. 10.

FIG. 12 is an enlarged cross-sectional view taken along line 12—12 of FIG. 11.

FIG. 13 is a cross-sectional view taken along the line 13—13 of FIG. 11.

FIG. 14 is an enlarged rear view of the cab door taken along line 14-of FIG. 11.

Briefly stated, the camper-cab passageway invention comprises a pickup truck having a cab with a camper mounted to the rear of the truck, said camper having a front doorway confronting the rear of the cab of the truck, a flexible bellows sleeve surrounds said doorway and abuts the rear of the cab, said cab having a doorway centrally of the width and along the back of the cab, the bellows surround said doorway in said cab, a pair of sliding doors are slidably mounted in said camper on opposite sides of of said front camper doorway and adapted to slide toward one another to close said doorway, a door panel detachably mounted to said cab to close said cab passageway when said camper is detached from said truck.

Figure 1:
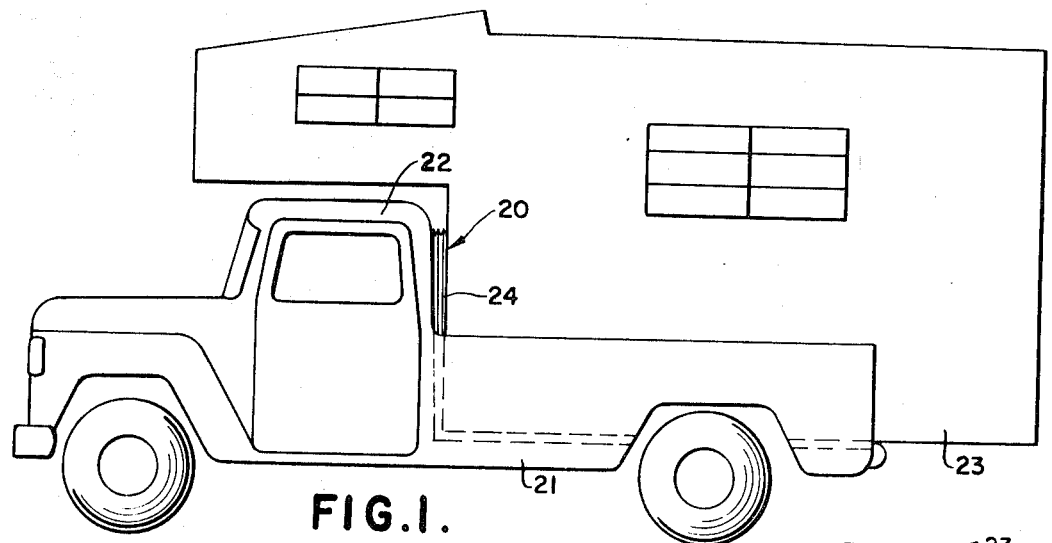
FIG. 1 is a side elevational view of the camper-cab passageway structure invention.

Referring more particularly to the drawing, in FIG. 1, the camper cab passageway invention 20 is illustrated as having a pickup truck 21 with a drivers cab 22 and a camper 23 mounted to the rear of the truck 21. A flexible rubber sleeve bellows 24 is mounted between the cab 22 and the camper 23.

Figures 2, 3:
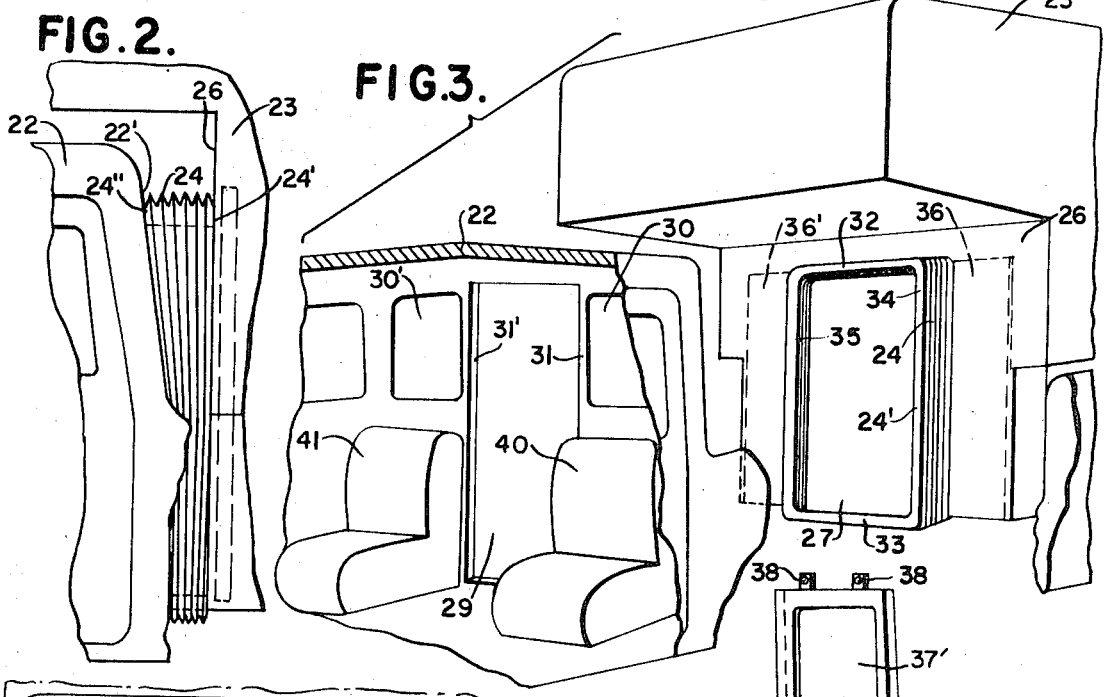
FIG. 2 is an enlarged fragmentary side elevational view of the camper and cab passageway structure invention.
FIG. 3 is an exploded perspective view of the camper and cab passageway structure invention.
Figures 3A, 4, 15, 16:
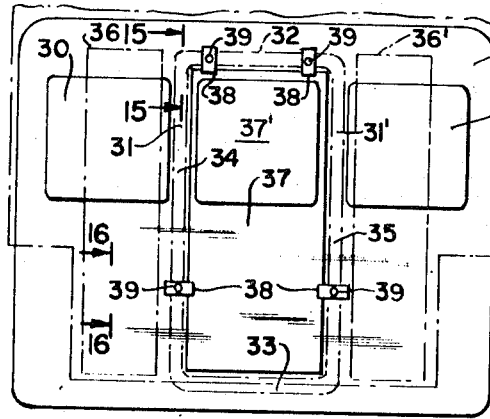
FIG. 3A is a perspective view of the removable door.
FIG. 4 is a rear view of the cab of the pickup truck with the camper illustrated in phantom lines.
FIG. 15 is a cross-sectional view taken along line 15—15 of FIG. 4.
FIG. 16 is a cross-sectional view taken along line 16—16 of FIG. 4.

The rubber bellows 24 has a rectangular sleeve shape with an accordianlike fold. The one face 24' of the sleeve bellows 24 is fixed to the front end 26 of the camper 23 and surrounds a doorway 27 in the front end 26 of the camper. The other outer face 24''of the bellows 24 is free and is adapted, when the camper is mounted to the rear of the truck 21, as illustrated in FIG. 1, to engage against the 24'' face 22' of the cab 22 as shown in FIGS. 2 & 4. When the camper is completely installed as shown in FIGS. 1 & 2, the outer face 24'' of the bellows 24 conforms to the outer face 22' of the cab to provide an airtight seal.

The back face 22' of the cab has a rectangular doorway 29 cut therethrough and a pair of side windows 30 and 30' with flat ribs 31 and 31' on the inner edge of the windows which form inner side frames for the windows and also act to provide a related flat surface for the inner face of the bellows to engage against, so that an airtight seal can be provided between the bellows and the cab, with the camper and the bellows which have been operatively installed as illustrated in FIGS. 1 and 2.

The outer face 24'' of the bellows 24 has a top and bottom flat edge portion 32 and 33 and side flat edges 34 and 35 which fit flush against the back face of the cab with the side flat edge 34 and 35 abutting the side ribs 30 and 30' of the backface of the cab to create an airtight seal.

A pair of sliding doors 36 and 36' are slidably mounted with the front panel 26 of the camper and are slidably mounted toward one another to move from their position shown in dashed lines in FIG. 3 to close the passageway in the front of the camper.

A removable metal door 37 has window 37' in the upper portion. The door 37 is mounted in the passageway 29 of the cab 22 when the camper 23 is removed from the truck. The rectangular metal door 37 has four lugs 38 which are fixed to the edges of the door 37 with bolts 39 which are threaded into the lugs 38 and into the back face 22' of the cab 22. The lugs 38 are rearwardly offset so that the door may fit flush with the back of the cab while the lugs project outwardly over the back face of the cab in staggered offset relation to the outer surface of the door.

In operating the invention, when it is desired to use the truck 21 without the camper 23, the camper 23, with the flexible bellows 24 attached thereto, will be removed from the rear of the truck 21 and the removable metal door 37 will be bolted into the doorway 29 in the back of the cab to close the doorway while using the truck without the camper.

If it is desired to install the camper to the truck, the door 37 will be removed from the cab 22 by unthreading bolts 39 from the cab thus freeing the door for its removal.

After the door 37 has been removed, the camper 23 will be installed into the rear of the truck, with the front face 24'' of the 24 abutting the rear face 22' of the cab 22 with the side flat edges 34 and 35 of the bellows abutting the side ribs 31 and 31' of the cab to create the airtight seal.

If it is desired to close the passageway between the cab and camper while the camper is installed, the sliding doors will be slid horizontally toward one another causing the passageway between the camper and the cab to be closed.

Within the cab of the truck are a pair of bucket seats 40 and 41 one of each side of the doorway 29 so that a person may walk easily between the cab of the truck and the camper while the truck is in motion, being driven on the roadway.

It will also be seen from the foregoing that the novel passageway structure enables the structure to be adapted to campers of different sizes and wherein the distance between the rear face of the cab and the front face of the camper vary. Also, in the event the camper is being stored out doors while detached from the truck, the sliding doors provide a closure to keep the camper closed from the outside air and to prevent leaves and other refuse from being blown into the camper through the doorway.

The bellows 24 may be made of other flexible material so as to adjust to different dimensions between the camper and the cab. The outer edge 24'' of the bellows may be secured to the back of the cab by bolts or other securing means.

FIRST MODIFIED FORM

In the first modified form of the invention 45 illustrated in FIGS. 5–8, inclusive, the pickup truck 21 and camper 23 are of the same type as illustrated in FIGS. 1–4, inclusive wherein the camper 23 is slidably and detachably mounted into the box 25 of the pickup truck 21.

The camper 23 has a rectangular doorway 47 along its forward wall or panel 48 which is offset to the right of the center of the forward panel 48. A U-shaped resilient cushion 49 is fixed or mounted to the outer face of the front panel 48 of the camper, with the apex 49' of the cushion 49 extending across the top of the doorway 47 and the legs 49" and 49''' extending along the vertical sides of the doorway. The cushion 49 may be made of sponge rubber and may have a bellowslike construction similar to the bellows 24.

The cab 22 of the pickup truck 21 also has a rectangular doorway 50 along its rear wall 51, which doorway is also offset to the right of the center of the rear wall 51 of the cab 22, when viewed from FIG. 8.

The doorway 50 of the cab 22 has a door 52, which fits into the doorway 50. The door 52 has an inner downward projecting lip 52' along its lower edge 53, which hooks over ridge 54 of the doorway 50. The upper edge 55 of the door has an L-shaped plate 56 with the vertical leg 56' welded to the top 55 of the door 52 and the horizontal leg 56" projecting over the top 57 of the cab 22 and a pair of bolts 91 & 91' pass freely through the plate portion 56" and are threaded with bores 59 & 59' on the top 57 of the cab.

The top panel 58 of the camper has a rectangular cutout 60 which further enlarges the doorway 47.

The camper 23 has a vertically slidable and foldable door 61. The door 61 has a flexible panel portion 61' with a plurality of zigzag folds. Reinforcement metal rods 62 are attached to and extend across the upper fold lines 63 of the panel 61' and are attached thereto by stitching or other conventional means. The panel also has a plurality of metal rods 64 which extend across the panel 61' at the lower fold lines 65 and the rods 64 are also attached to the panel 61' by stitching or other conventional means.

The outer ends 64' and 64" of each of the rods 64 project into a pair of U-channels 66 & 67 which are fixed on opposite sides of the doorway 47 on the inside face 48' of the front wall or panel 48 of the camper. The outer ends 64' and 64" of the rods 64 act as guides to align the panel 61' of the folding door 61 by sliding up and down in the channels 66 & 67, so that the panel 61' of the folding door 61 may slide upward and fold into an accordianlike shape as illustrated in FIG. 5 or the panel 61' of the folding door 61 may be slid downward to a relatively flat or straightened position as illustrated in FIG. 6 to close the doorway 47 with the rods 64 sliding in the channels 66 & 67 acting to maintain the panel of the folding door 61 in alignment in the doorway 47.

When it is desired to use the camper 23 with the pickup truck 21, the door 52 will be slid or moved along the rear wall of the cab from its position shown in FIG. 9 to its position shown in FIGS. 5 & 8, an whereupon the door 52 will be secured in this position by the bolts 91 & 91' being threaded into a second set of bores 68 & 69 in the top 57 of the cab to thereby secure the door 52 to the cab, with the door offset to the left of the center of the rear of the cab when viewed from FIG. 8. Once the door 52 has been moved to its left of center position, the camper 23 may then be slid onto the box 24 of the pickup truck shown in FIG. 5, with the legs 49" and 49''' of the cushion 49 engaging the rear wall of the cab and the apex 49' of the cushion engaging the top 57 of the cab and extending across the top of the doorway 50 to provide an enclosure or seal the doorway 50.

Once the camper 23 has been placed in position, the the vertically slidable and folding door 61 may be operated to open and close the passageway between the cab and camper formed by the cushion 49 between doorways 47 & 50.

When it is desired to use the pickup truck without the camper, the camper 23 will be slidably removed from the box 25 and the door 52 will be slid from its position shown in solid lines in FIGS. 5, 6, & 8 and phantom lines in FIG. 9, designated by numeral 92 to its position shown in solid lines in FIG. 9 with the door 52 fitted flush into the doorway 50 with the lower lip 52' of the door 52 hooked over the lip 54 of the doorway 50 and the top plate portion 56" of the door bolted to the top 57 of the cab by the bolts 91 & 91' being threaded back into bores 59 & 59' to thereby close the doorway in the cab of the pickup truck.

When the camper is being stored detached from the pickup truck, the folding door 61 may then be closed to substantially seal the camper from the outside environment or weather.

SECOND MODIFIED FORM

The second modified form of passageway structure between the camper 23 and the cab 22 of the pickup truck 21 is illustrated in FIGS. 10–14, inclusive wherein the pickup truck 21 and camper 23 are also of the same type as illustrated in FIGS. 1–4, with the camper 23 slidably and detachably mounted in the box 25 of the pickup truck 21.

The camper 23 has a rectangular doorway 70 along its forward wall 84 which doorway is offset to the right of the center of the forward wall 84 of the camper when viewed from FIG. 13. The cab 21 of the pickup truck 20 also has a rectangular doorway 72 along its rear wall 73 which is also offset to the right of the center of the rear wall 73 of the cab, when viewed from FIG. 13.

The pickup truck cab has a folding door 74 which is of the same type as illustrated in the first modified form of the invention employing flexible panel 75 which when opened as illustrated in FIG. 11 has a zigzag shape when opened and designated by numeral 76 and which may be straightened out to a closed position as illustrated in phantom lines in FIG. 10 and designated by numeral 77.

The panel 75 of the folding door 74 also has a plurality of metal reinforcement rods 78 which are sewn to the upper fold lines 79 of the panel 75 and a plurality of metal reinforcement rods 80 which are sewn to the lower fold lines 79 of the panel 75. The lower metal reinforcement rods 80 have their outer ends 80' & 80" projecting out into a pair of U-channels 81 & 82 which U-channels extend in parallel relation to one another along the top and rear wall of the cab 22.

The rods 80 slide in the U-channels 81 & 82 as the door 74 is folded to an open position and when the door 74 straightened out to close the doorway, and maintain and guide the flexible door 74.

A wooden door 83 is slidably mounted in the front wall 84 of the camper to slide horizontally along the front wall 84 of the camper from its open position shown in FIG. 13, in dashed and solid lines to a position across the doorway 70 to close the front wall 84 of the camper.

When it is desired to use the pickup truck 21 without the camper 23, the camper 23 will be removed and the folding door 75 will be straightened out to close the cab of the pickup truck.

The sliding door 83 of the camper will also be closed to seal the camper from the weather.

The camper 23 also has a U-shaped cushion 85 fixed thereto made of sponge rubber or which also may have a bellowslike construction and made of rubber. The cushion 85 has its apex 85' extending along the underside of the horizontal panel 86 of the camper and its legs 85 & 85" extending along the front wall 84 of the camper on opposite sides of the doorway 70 of the camper.

A pair of generally triangularly shaped wooden filler panel members 87 & 88 are fitted and extend between the legs of the cushion 85 and the front wall 84 of the camper to provide a connection between the sleeve and camper and to mould the contour of the sleeve.

When it is desired to use the pickup truck 21 with the cab 23, the folding door 74 will be slid and folded upward to its position shown in FIG. 10 to open the cab doorway 72, and the camper will be slid onto the box of the pickup truck with the U-shaped resilient cushion 85, which is similar to the cushion 49 engaging around the sides and top of the doorway in the cab of the pickup truck to thereby seal camper to the cab and the sliding door 83 may be used to open and close the passageway between the cab and camper.

Similarly in the first modified form of the invention a pair of wooden panel members 89 & 90 are fitted between the legs of the cushion 49 and the front wall 48 of the camper to provide a connection between the sleeve and camper and mould the contour of the sleeve.

The camper 23 illustrated in the second modified form of the invention (FIG. 10-12) may also be employed with the cab 22 of the pickup truck 20 and its door and doorway construction, illustrated in FIGS. 5-9 of the first form of the invention, as the camper 23 of the third form of the invention is interchangeable between either the cab 23 of the first modified form of the invention or the cab 23 of the second modified form of the invention.

The cushions 49 & 85 in the second and third forms of the invention will be under slight compression against the backwall of the cab when the camper is mounted to the pickup truck to create a weatherproof enclosure.

It will be obvious that various changes and departures may be made to the invention without departing from the spirit thereof and accordingly it is not intended that the invention be limited to that specifically described in the specification or illustrated in the drawing but only as set forth in the appended claims wherein:

What is claimed is:

1. A truck camper comprising a pickup truck with a box mounted to the rear of said truck, a camper mounted to said box, said pickup truck having a cab, said camper having a vertically elongated doorway in the front of said camper extending downward in length and terminated adjacent the bottom of said camper, said cab having a vertically elongated doorway along its rearward portion coinciding in width and length with said camper doorway, a vertically elongated sleeve having resilient surfaces under compression between said camper and cab and surrounding said doorway, said cab having a vertically elongated door panel for closing said cab doorway and detachable from said cab doorway for the attachment of said camper and sleeve to said pickup truck and cab, wherein said resilient sleeve forms a folding bellowslike construction and wherein said camper has slidable door means along its front slidable horizontally to close said camper doorway.

2. A truck camper comprising a pickup truck with a box mounted to the rear of said truck, a camper mounted to said box, said pickup truck having a cab, said camper having a vertically elongated doorway in the front of said camper extending downward in length and terminated adjacent the bottom of said camper, said cab having a vertically elongated doorway along its rearward portion coinciding in width and length with said camper doorway, a vertically elongated inverted U-shaped cushion having resilient surfaces under compression between said camper and cab and surrounding said doorway, said cab having a vertically elongated door panel for closing said cab doorway and for the attachment of said camper and sleeve to said pickup truck and cab, and wherein said cab door panel is slidable to close said cab doorway and adjustable to a position on said cab away from said cab doorway for attachment of said camper and cushion to said pickup truck and cab, said resilient cushion forming a passageway between said camper and cab doorways, said camper having slidably door means to slidably close said camper doorway.

3. A truck camper comprising a pickup truck with a box mounted to the rear of said truck, a camper mounted to said box, said pickup truck having a cab, said camper having a vertically elongated doorway in the front of said camper extending downward in length and terminated adjacent the bottom of said camper, said cab having a vertically elongated doorway along its rearward portion coinciding in width and length with said camper doorway, a vertically elongated inverted U-shaped channel having resilient surfaces under compression between said camper and cab and surrounding said doorway, said cab having a vertically elongated door panel for closing said cab doorway and movable away from said cab doorway for the attachment of said camper and sleeve to said pickup truck and cab, said channel forming a passageway between said camper and cab doorways, said camper having slidably door means to close said camper doorway.

* * * * *